(12) United States Patent
Lei et al.

(10) Patent No.: US 11,901,729 B2
(45) Date of Patent: Feb. 13, 2024

(54) CHARGING DEVICE AND EMERGENCY START METHOD

(71) Applicant: SHENZHEN CARKU TECHNOLOGY CO., LIMITED, Guangdong (CN)

(72) Inventors: Yun Lei, Guangdong (CN); Mingxing Ouyang, Guangdong (CN); Zhifeng Zhang, Guangdong (CN)

(73) Assignee: SHENZHEN CARKU TECHNOLOGY CO., LIMITED, Shenzhen (CN)

( * ) Notice: Subject to any disclaimer, the term of this patent is extended or adjusted under 35 U.S.C. 154(b) by 149 days.

(21) Appl. No.: 17/528,717

(22) Filed: Nov. 17, 2021

(65) Prior Publication Data

US 2022/0077681 A1   Mar. 10, 2022

Related U.S. Application Data

(63) Continuation-in-part of application No. 16/862,242, filed on Apr. 29, 2020, now Pat. No. 11,205,920.

(30) Foreign Application Priority Data

Mar. 11, 2019 (CN) .......................... 201910182347.5

(51) Int. Cl.
*H02J 1/10* (2006.01)
*H02J 7/00* (2006.01)
*H02J 7/34* (2006.01)

(52) U.S. Cl.
CPC ............ *H02J 1/122* (2020.01); *H02J 7/0034* (2013.01); *H02J 7/0047* (2013.01); *H02J 7/0068* (2013.01); *H02J 7/342* (2020.01)

(58) Field of Classification Search
CPC .......... H02J 1/122; H02J 7/342; H02J 7/0034; H02J 7/0047; H02J 7/0068
(Continued)

(56) References Cited

U.S. PATENT DOCUMENTS

| 7,161,253 B2 | 1/2007 | Sodemann et al. |
| 2014/0138960 A1 | 5/2014 | Huang |

(Continued)

FOREIGN PATENT DOCUMENTS

| CN | 205901352 U | 1/2017 |
| CN | 107910951 A | 4/2018 |

(Continued)

OTHER PUBLICATIONS

The European Search Report issued in corresponding European Patent Application No. EP20171066, dated Aug. 17, 2020, European Patent Office, Munich, Germany.

(Continued)

*Primary Examiner* — Michael R. Fin
(74) *Attorney, Agent, or Firm* — HAUPTMAN HAM, LLP

(57) ABSTRACT

The present disclosure discloses a charging device, which comprises an energy storage module, an output interface, a detection unit, a switch module, a control module, and a capacitor. The output interface is configured to be electrically coupled to a load. The detection unit detects electrical parameters of the load and the energy storage module. The switch module is electrically coupled between the energy storage module and the output interface. When the load is electrically coupled to the output interface, the control module turns on the switch module based on the electrical parameters of the load and the energy storage module, to switch on an electrical connection between the energy storage module and the output interface. The capacitor is (Continued)

configured to keep the switch module in an on state steadily when the control module turns on the switch module. The present disclosure also discloses an emergency starting method.

16 Claims, 5 Drawing Sheets

(58) Field of Classification Search
USPC .................................................. 307/10.6
See application file for complete search history.

(56) References Cited

U.S. PATENT DOCUMENTS

| | | | | |
|---|---|---|---|---|
| 2015/0357141 | A1* | 12/2015 | Chennakesavan | H01H 47/32 |
| | | | | 361/194 |
| 2016/0327007 | A1* | 11/2016 | Averbukh | H02J 7/345 |
| 2018/0301919 | A1* | 10/2018 | Rumbaugh | H01M 50/244 |
| 2020/0067333 | A1 | 2/2020 | Wekwert et al. | |

FOREIGN PATENT DOCUMENTS

| | | |
|---|---|---|
| CN | 207283184 U | 4/2018 |
| CN | 207388879 U | 5/2018 |
| CN | 109412225 A | 3/2019 |
| WO | 2013123943 A2 | 8/2013 |
| WO | 2018000130 A1 | 1/2018 |

OTHER PUBLICATIONS

Chinese Office Action issued in corresponding Chinese Application No. 201910182347.5, dated May 25, 2020, pp. 1-8, State Intellectual Property Office of P.R. of China, Beijing, China.

U.S. Office Action issued in corresponding U.S. Appl. No. 16/862,242, dated Apr. 21, 2021, pp. 1-15, United States Patent and Trademark Office.

* cited by examiner

CHARGING DEVICE AND EMERGENCY START METHOD

CROSS-REFERENCE TO RELATED APPLICATION(S)

This application is a continuation in part application of U.S. application Ser. No. 16/862,242, filed on Apr. 29, 2020, which claims the benefit of priority to Chinese Patent Application No. 201910182347.5, filed on Mar. 11, 2019, the disclosures of both of which are incorporated herein by reference in their entireties.

TECHNICAL FIELD

The present disclosure relates to the technical field of automotive power supply, and in particular, to a charging device and an emergency starting method.

BACKGROUND

As a starting power supply for automobiles, lead-acid batteries have always dominated the automotive field due to their advantages such as high and low temperature tolerance, high safety, high charge and discharge efficiency, low cost, and easy maintenance. However, after long-term use, lead-acid batteries will also experience problems such as aging, less charge and discharge cycles, and severe decay by high-current charge and discharge. As a result, the automobile cannot start normally due to insufficient power supply of lead-acid batteries. Therefore, an emergency starting power supply capable of starting the automobile in an emergency when the power supply from the internal battery is insufficient is widely welcomed by people.

Most of the automotive existing emergency starting power supplys use lead-acid batteries or lithium-ion batteries as energy storage units, so as to provide an emergency starting current to the automobile through the energy storage unit when the power supply of the internal battery of the automobile is insufficient.

However, once the existing emergency starting power supply is coupled to the automotive battery, it will automatically output power to the battery, that is, it will automatically charge the battery. Thereby the power of the emergency starting power supply is wasted, decreasing the usage efficiency of the emergency starting power supply. In addition, if the automobile is not started in time, it is easy to run out of the power of the energy storage unit in the emergency starting power supply and can no longer to start the automobile.

SUMMARY

An embodiment of the disclosure discloses a charging device and an emergency starting method to solve the above problems.

An embodiment of the present disclosure discloses a charging device. The charging device includes an energy storage module, an output interface, a switch module, a detection unit, a control module, and a capacitor. The energy storage module is configured to store and provide electrical energy. The output interface is configured to be electrically coupled to a load. The switch module is electrically coupled between the energy storage module and the output interface. The detection unit is configured to detect electrical parameters of the load and the energy storage module. The control module is electrically coupled to the detection unit and the switch module respectively, wherein when the load is electrically coupled to the output interface, the control module is configured to turn on the switch module based on the electrical parameters of the load and the energy storage module, to switch on an electrical connection between the energy storage module and the output interface. The capacitor is electrically coupled to the switch module, wherein the capacitor is configured to keep the switch module in an on state steadily when the control module turns on the switch module.

An embodiment of the present disclosure also discloses an emergency starting method applied in the above charging device. The emergency starting method includes: detecting electrical parameters of the energy storage module and a load, when the load is electrically coupled to the output interface; and turning on the switch module based on the electrical parameters of the load and the energy storage module, to switch on an electrical connection between the energy storage module and the output interface.

BRIEF DESCRIPTION OF THE DRAWINGS

In order to illustrate the technical solutions in the embodiments of the present disclosure more clearly, the drawings used in the embodiments will be briefly introduced below. Obviously, the drawings in the following description are only some embodiments of the present disclosure. Those of ordinary skill in the art can obtain other drawings according to these drawings without creative efforts.

DETAILED DESCRIPTION

Figure 1:
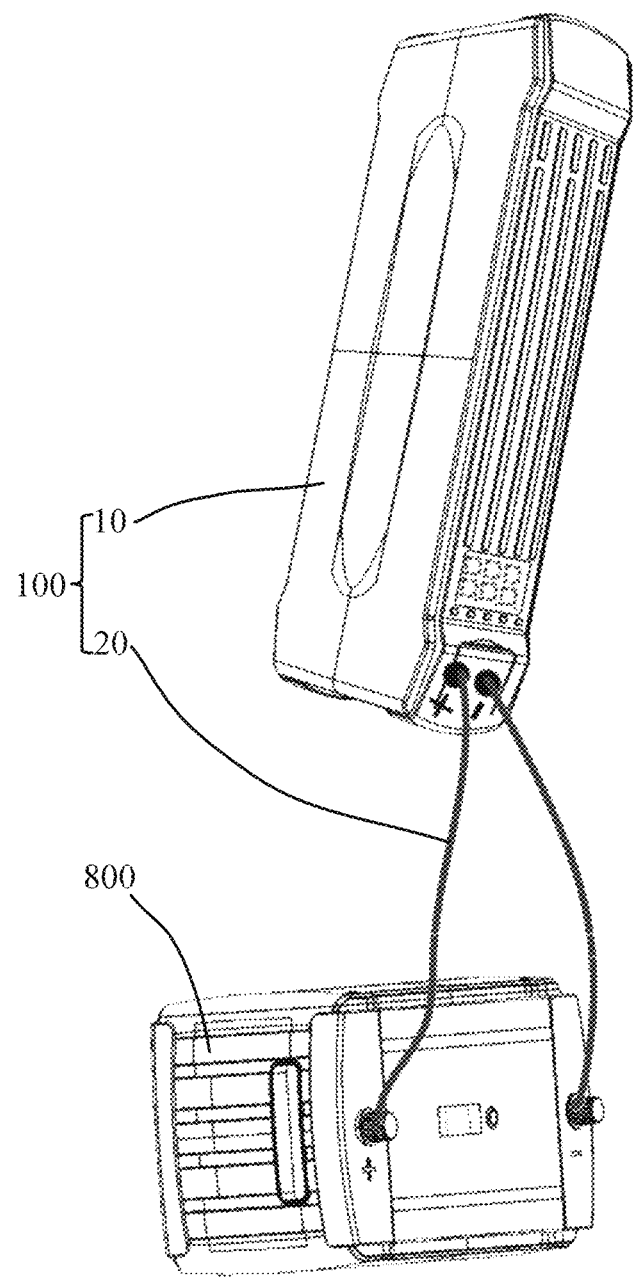
FIG. 1 is a schematic diagram of using an emergency starting power supply according to an embodiment of the present disclosure.

In the following, the technical solutions in the embodiments of the present disclosure will be clearly and completely described with reference to the drawings in the embodiments of the present disclosure. Obviously, the embodiments described are only a part of the embodiments of the present disclosure, but not all of them. Based on the embodiments of the present disclosure, all other embodiments obtained by a person of ordinary skill in the art without creative efforts shall fall within the protection scope of the present disclosure.

When an element is considered to be "coupled" or "connected" to another element, it can be directly connected to another element or intervening elements may also be present. Unless defined otherwise, all technical and scientific terms used herein have the same meaning as commonly understood by person of ordinary skill in the art to which this disclosure belongs. The terminology used herein in the description of the disclosure is for the purpose of describing particular embodiments only and is not intended to limit the disclosure.

According to an embodiment of the present disclosure, a charging device is provided. The charging device includes an energy storage module, an output interface, a switch module, a detection unit, a control module, and a capacitor. The energy storage module is configured to store and provide electrical energy. The output interface is configured to be electrically coupled to a load. The switch module is electrically coupled between the energy storage module and the output interface. The detection unit is configured to detect electrical parameters of the load and the energy storage module. The control module is electrically coupled to the detection unit and the switch module respectively, wherein when the load is electrically coupled to the output interface, the control module is configured to turn on the switch module based on the electrical parameters of the load and the energy storage module, to switch on an electrical connection between the energy storage module and the output interface. The capacitor is electrically coupled to the switch module, wherein the capacitor is configured to keep the switch module in an on state steadily when the control module turns on the switch module.

According to an embodiment of the disclosure, an emergency starting method is provided. The emergency starting method is applied in the above charging device. In the emergency starting method, electrical parameters of the energy storage module and a load are detected, when the load is electrically coupled to the output interface; and, the switch module is turned on based on the electrical parameters of the load and the energy storage module, to switch on an electrical connection between the energy storage module and the output interface.

The above-mentioned "charging device" can be implemented in the form of an emergency starting power supply, and the above-mentioned "load" can be implemented in the form of an automobile battery. For the convenience of description, the technical scheme of the present disclosure is introduced in detail by taking the charging device as an emergency starting power source, and the load as an automobile battery as an example. Embodiments of the disclosure will be detailed below.

Please refer to FIG. 1, which is a schematic diagram of using an emergency starting power supply 100 according to an embodiment of the present disclosure. The emergency starting power supply 100 may be coupled to an anode and a cathode of a battery (accumulator) 800 in an automobile. Because the automotive battery 800 is coupled to an automobile engine, after the emergency starting power supply 100 is coupled to the automotive battery 800, both of them can provide starting current together to the automobile engine to start the automobile.

Figure 2:
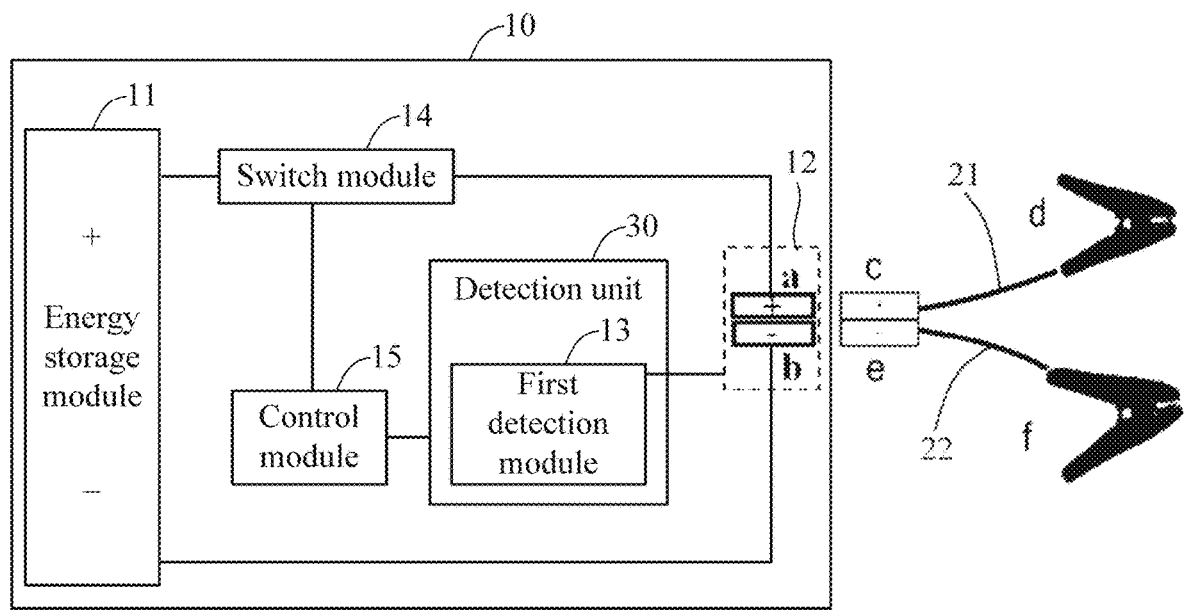
FIG. 2 is a principle block diagram of an emergency starting power supply according to another embodiment of the present disclosure.

Please refer to FIG. 2, which is a schematic block diagram of the emergency starting power supply 100 according to an embodiment of the present disclosure. As shown in FIG. 2, the emergency starting power supply 100 comprises a main body 10, wherein the main body 10 comprises an energy storage module 11, an output interface 12, a detection unit 30, a switch module 14, and a control module 15. The energy storage module 11 is configured to store and provide electrical energy. The output interface 12 is electrically coupled to the energy storage module 11, and is configured to be electrically coupled to the automobile battery 800. The energy storage module 11 is configured to output an emergency starting current through the output interface 12 to start the automobile.

The switch module 14 is electrically coupled between the energy storage module 11 and the output interface 12. The switch module 14 is configured to establish/switch on an electrical connection between the energy storage module 11 and the output interface 12 when the switch module 14 is in an on state, and disconnect/switch off the electrical connection when the switch module 14 is in an off state. In this embodiment, the switch module 14 is in an off state by default.

The detection unit 30 is configured to detect electrical parameters of the battery 800. The control module 15 is electrically coupled to the detection unit 30 and the switch module 14 respectively.

In an embodiment, when the battery 800 is electrically coupled to the output interface 12, the control module 15 is configured to turn on the switch module 14 based on the electrical parameters of the battery 800, to switch on the electrical connection between the energy storage module 11 and the output interface 12.

Specifically, in the embodiment, the detection unit 30 includes a first detection module 13 electrically coupled to the output interface 12 and the control module 15 respectively. When the output interface 12 is coupled to the battery 800, the first detection module 13 is configured to detect the electrical parameters of the battery 800 through the output interface 12, and send the detected electrical parameters of the battery 800 to the control module 15.

In the embodiment, the electrical parameters of the battery 800 include a voltage. The control module 15 is configured to receive the voltage of the battery 800 detected by the first detection module 13, and determine whether a voltage drop of the battery 800 within a first preset duration is greater than a preset voltage drop according to the voltage detected by the first detection module 13, and turn on the switch module 14 to switch on the electrical connection between the energy storage module 11 and the output interface 12 when the voltage drop of the battery 800 within the first preset duration is greater than the preset voltage drop, so that the energy storage module 11 provides an emergency starting current to an automobile engine through the output interface 12 and the battery 800 to start the automobile in an emergency. Wherein, the emergency starting current provided by the emergency starting power supply 100 to the automobile engine is an instantaneous high current. For example, the instantaneous high current can be more than 1000 A, which can be set according to actual use conditions, and is not specifically limited herein.

It can be understood that according to different specific designs, the energy storage module 11 may include different numbers of multiple battery modules coupled in series. For example, if the output voltage of the energy storage module 11 is required to be high, a larger number of battery modules may be coupled in series. If the energy storage module 11 is required to output a lower voltage, a smaller number of battery modules may be coupled in series. The specific number of battery modules is not limited herein.

Further, each battery module may include a single battery, or may be consist of multiple single batteries coupled in parallel thereby increasing the output current of the energy storage module 11. In this embodiment, the single battery is preferably a lithium-ion battery that is light in weight, energy saving, and environmentally friendly.

In some embodiments, the control module 15 determines whether the emergency starting power supply 100 is electrically coupled to the battery 800 according to the voltage detected by the first detection module 13. Specifically, since the switch module 14 is in an off state by default, when the voltage detected by the first detection module 13 is greater than a voltage threshold, it means that the battery 800 has been coupled to the emergency starting power supply 100. If the voltage detected by the first detection module 13 is not greater than the voltage threshold, it means that the battery 800 is not coupled to the emergency starting power supply 100. Wherein, the voltage threshold can be set to 0.5V. Of course, the voltage threshold can also be set according to specific conditions. In other embodiments, whether the emergency starting power supply 100 is electrically coupled to the battery 800 may be determined according to other methods. For example, when the emergency starting power supply 100 and the battery 800 are electrically coupled together, a trigger signal is generated to the control module 15.

According to the emergency starting power supply 100 disclosed in the embodiment of the present disclosure, when the emergency starting power supply 100 is coupled to the battery 800, the energy storage module 11 does not output electrical energy to the battery 800, which can prevent the emergency starting power supply 100 from automatically charging the battery 800. When a decrease in the voltage of the battery 800 is detected and the voltage drop within the first preset duration reaches the preset voltage drop, the switch module 14 is turned on to switch on the electrical connection between the energy storage module 11 and the output interface 12. At this time, the energy storage module 11 can provide electrical energy to the battery 800 to start the automobile in an emergency, thereby improving the usage efficiency of the emergency starting power supply 100.

It should be noted that when the automobile's start button is pressed or the key is in the "ON" state, it means that the automobile is about to start. At this time, the voltage of the battery 800 will decrease. Therefore, when the voltage drop of the battery 800 is detected, it can be determined that the automobile needs to be started. At this time, the switch module 14 is turned on to establish the electrical connection between the energy storage module 11 and the output interface 12, so that the energy storage module 11 can provide emergency starting current to the automobile to start the automobile. The emergency starting power supply 100 disclosed in the embodiment of the present disclosure outputs electrical energy only when the automobile is ignited. When the automobile is not ignited, although the emergency starting power supply 100 is coupled to the battery 800, it does not output power. Therefore, even if the user electrically connects the emergency starting power supply 100 with the battery 800 but does not start the automobile in time, the electrical energy of the emergency starting power supply 100 will not be consumed, thereby improving the usage efficiency of the emergency starting power supply 100.

In some embodiments, the first preset duration may be 40 ms, and the preset voltage drop may be 0.1V. In other implementations, the preset duration and the preset voltage drop may be specifically determined according to a specific vehicle type and a battery type, and are not limited herein.

It can be understood that, after the switch module 14 is turned on, if the automobile has been started but the switch module 14 is kept in the on state, unnecessary energy loss may be caused. In addition, if the switch module 14 is kept in the on state, but the automobile isn't started due to some failures, such as the automobile's engine failure, safety events and unnecessary energy loss may be caused by the automobile's engine failure.

In some embodiments, in order to further improve the usage efficiency of the emergency starting power supply 100 and avoid the situation that the emergency starting power supply 100 still outputs power to the battery 800 after the automobile is started, when the switch module 14 is turned on, the control module 15 further determines whether a duration during which the switch module 14 is in an on state is greater than a second preset duration, and when the duration during which the switch module 14 is in the on state is greater than the second preset duration, the control module 15 turns off the switch module 14 to switch off the electrical connection between the energy storage module 11 and the output interface 12, so that the energy storage module 11 stops outputting electrical energy.

In this way, it can be understood that, after the switch module 14 is turned on, even if the automobile isn't started due to some failures, safety events and unnecessary energy loss caused by the automobile's engine failure can be effectively avoided, because the control module 15 will turn off the switch module 14 based on the duration during which the switch module 14 is kept in an on state.

Wherein, since the starting time of an automobile is usually about 3 s, in order to ensure the starting time of the automobile, in a preferred embodiment, the second preset duration is 4-6 s.

Please refer to FIG. 1 and FIG. 2 together, in some embodiments, the emergency starting power supply 100 further includes a connection component 20. One end of the connection component 20 is detachably coupled to the main body 10 through the output interface 12, and the other end of the connection component 20 is detachably coupled to the battery 800.

Specifically, the output interface 12 includes a positive interface "a" and a negative interface "b". The connection component 20 includes a first connection line 21 and a second connection line 22. One end of the first connection line 21 is provided with a first positive connection terminal "c", and the other end of the first connection line 21 is provided with a second positive connection terminal "d". One end of the second connection line 22 is provided with a first negative connection terminal "e", and the other end of the second connection line 22 is provided with a second negative connection terminal "f". Wherein, the first positive connection terminal "c" can be electrically coupled to the positive interface "a", the first negative connection terminal "e" can be electrically coupled to the negative interface "b", the second positive connection terminal "d" can be electrically coupled to the anode of the automotive battery 800, and the second negative connection terminal "f" can be electrically coupled to the cathode of the automotive battery 800, so that the main body 10 of the emergency starting power supply 100 can be electrically coupled to the automotive battery 800, and then the emergency starting power supply 100 and the automotive battery 800 can provide an emergency starting current to the automobile engine to start the automobile in an emergency.

Optionally, the second positive connection terminal "d" is a positive clip, and the second negative connection terminal "f" is a negative clip, so as to facilitate the connection of the connection component 20 to the automotive battery 800. However, the present disclosure does not limit the specific forms of the second positive connection end "d", and the second negative connection end "f". In another embodiments, the detection unit 30 is further configured to detect electrical parameters of the energy storage module 11. When the battery 800 is electrically coupled to the output interface 12, the control module 15 is configured to turn on the switch module 14 based on the electrical parameters of the battery 800 and the energy storage module 11, to switch on the electrical connection between the energy storage module 11 and the output interface 12.

Figure 3:
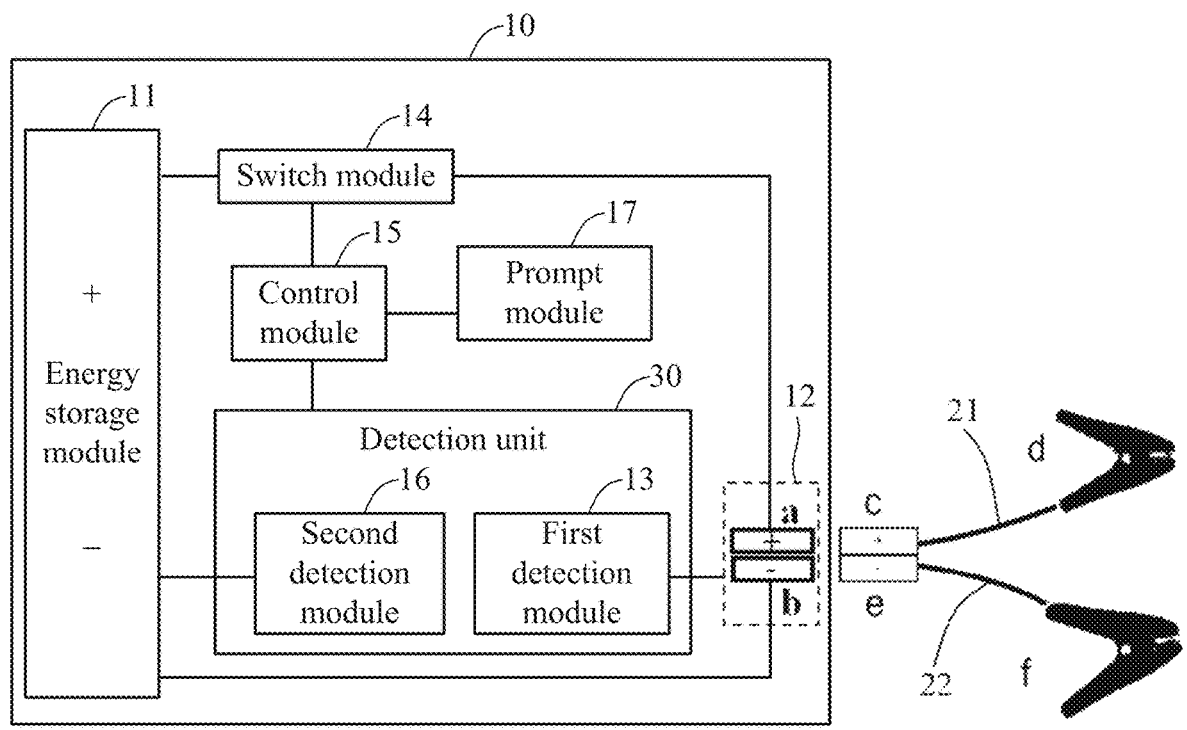
FIG. 3 is a principle block diagram of an emergency starting power supply according to another embodiment of the present disclosure.

Specifically, please refer to FIG. 3, the detection unit 30 further includes a second detection module 16 electrically coupled to the energy storage module 11 and the control module 15 respectively. The second detection module 16 is configured to detect the electrical parameters of the energy storage module 11, and send the detected electrical parameters of the energy storage module 11 to the control module 15.

In the embodiment, the electrical parameters of the energy storage module 11 include a voltage. The control module 15 is further configured to receive the voltage of the energy storage module 11 detected by the second detection module 16. When the output interface 12 is coupled to the battery 800 of the automobile, the control module 15 is configured to determine whether the voltage of the energy storage module 11 is greater than the voltage of the battery 800, as well as determine whether a voltage drop of the battery 800 within a first preset duration is greater than a preset voltage drop based on the detected voltage of the battery 800. When the voltage of the energy storage module 11 is greater than the voltage of the battery 800 and the voltage drop of the battery during the first preset duration is greater than a preset voltage drop, the control module 15 turns on the switch module 14, so that the emergency starting power supply 100 can start the automobile normally.

In some embodiments, the main body 10 further includes a prompt module 17. The prompt module 17 is electrically coupled to the control module 15. When the control module 15 determines that the voltage of the energy storage module 11 is not greater than the voltage of the battery 800, the control module 15 controls the prompt module 17 to issue prompt information to prompt the user that the emergency starting power supply 100 cannot start the automobile and prevent the battery 800 from charging the emergency starting power supply 100. Wherein, the prompt module 17 may be a light emitting diode, a buzzer, or the like.

Wherein, the control module 15 may be a single-chip microcomputer, a microcontroller (Micro Control Unit, MCU), or the like. The control module 15 may include multiple signal acquisition pins, control pins, and the like. Among them, the control module 15 may further electrically coupled to the first detection module 13 and the second detection module 16 by its multiple signal acquisition pins, so as to obtain the voltages of the battery 800 and the energy storage module 11. The control module 15 can also be electrically coupled to the switch module 14 and the prompt module 17 by its control pins to control the corresponding modules accordingly.

Figure 4:
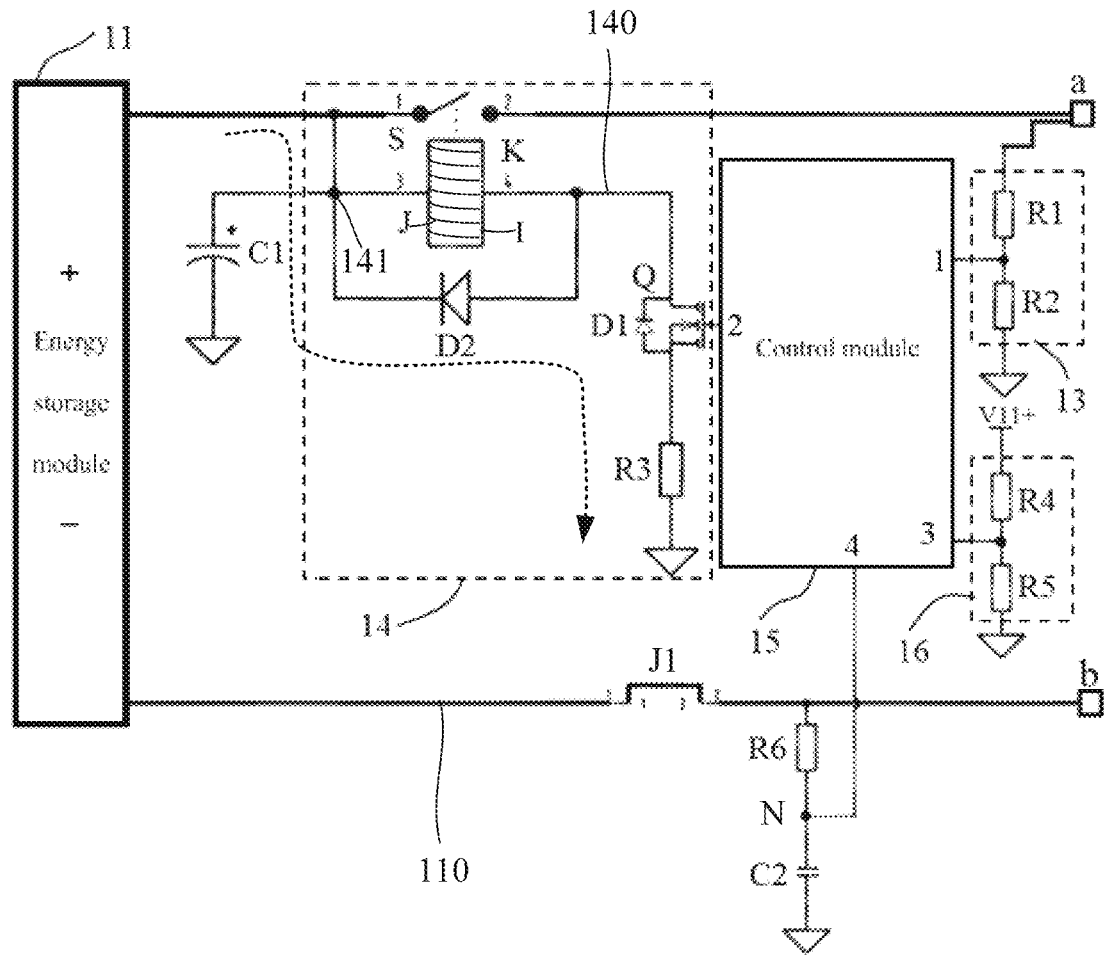
FIG. 4 is a circuit schematic diagram of an emergency starting power supply according to an embodiment of the present disclosure.

Please refer to FIG. 4, which is a schematic circuit diagram of an emergency starting power supply 100 according to an embodiment of the present disclosure. As shown in FIG. 4, the first detection module 13 includes a first resistor R1 and a second resistor R2. The first connection end of the first resistor R1 is electrically coupled to the positive interface "a", and can further be electrically coupled to the anode of the battery 800 via the positive interface "a". The second connection end of the first resistor R1 is grounded via the second resistor R2. The first detection pin "1" of the control module 15 is coupled to a connection node between the first resistor R1 and the second resistor R2.

When the main body 10 of the emergency starting power supply 100 is not coupled to the battery 800, the divided voltage across the second resistor R2 is 0. When the main body 10 of the emergency starting power supply 100 is coupled to the battery 800 via the connection component 20, the positive interface "a" is electrically coupled to the anode of the battery 800, and the negative interface "b" is electrically coupled to the cathode of the battery 800. At this time, the control module 15 can acquire the voltage of the battery 800 by collecting the divided voltage across the second resistor R2. Therefore, when the control module 15 detects that the divided voltage across the second resistor R2 is greater than a voltage threshold, it can be determined that the emergency starting power supply 100 and the battery 800 are connected together.

In the embodiment, the switch module 14 includes a relay K and a driving power circuit 140 of the relay K. The relay K is electrically coupled between the energy storage module 11 and the output interface 12. The driving power circuit 140 is configured to receive and transmit a driving power to the relay K to turn on the relay K, when the driving power circuit 140 is in an on state.

The driving power circuit 140 includes a driving power input terminal 140 configured to receive the driving power for the relay K. In the embodiment, the driving power is provided by the energy storage module 11, and the driving power input terminal 140 is coupled to the energy storage module 11. In other embodiments, the driving power can be provided by other components of the emergency starting power supply 100, such as a voltage stabilizing module (not shown).

In some embodiments, a first connection terminal "1" of the relay K is electrically coupled to an anode/a positive connection terminal "+" of the energy storage module 11, a second connection terminal "2" of the relay K is electrically coupled to the positive interface "a", a third connection terminal "3" of the relay K is coupled to the power input terminal 141, and a fourth connection terminal "4" of the relay K is electrically coupled to the driving power circuit 140.

Specifically, the relay K includes a switch unit S, an iron core I, and a coil J. The switch unit S is electrically coupled between the energy storage module 11 and the output interface 12. In the embodiment, the switch unit S is a single-pole single-throw switch S, and the first connection terminal "1" and the second connection terminal "2" of the relay K correspond to a static contact and a moving contact of the single-pole single-throw switch S, respectively. The third connection terminal "3" and the fourth connection terminal "4" of the relay K correspond to two ends of the coil J, respectively.

The coil J is wound on the iron core I, and is electrically coupled in series in the driving power circuit 140. The coil J is configured to cause the switch unit S to be in an on state when the driving power is transmitted in the driving power circuit 140 and a current is flowed through the coil J, wherein a direction of current in the driving power circuit 140 is shown in the direction of the dashed arrow in FIG. 4.

Specifically, when the driving power circuit 140 is in the on state, and the driving power is transmitted in the driving power circuit 140, the current is flowed through the coil J, electromagnetic effects is therefore generated in the coil J, and a swing arm of the single-pole single-throw switch S is thus attracted to the iron core I under the attraction of electromagnetic force, in this way, the static contact and the moving contact of the single-pole single-throw switch S are connected together by the swing arm, to make the single-pole single-throw switch S be in an on state, so as to realize the electrical connection between the energy storage module 11 and the battery 800.

When the driving power disappears or the driving power circuit 140 is in an off state, the electromagnetic effect in the coil J disappears, and the electromagnetic attraction on the iron core I also disappears, and the swing arm of the single-pole single-throw switch S returns to its original position, thereby disconnecting the static contact and the moving contact of the single-pole single-throw switch S, to make the single-pole single-throw switch S be in an off state, and then the electrical connection between the energy storage module 11 and the battery 800 is disconnected.

In the embodiment, the emergency starting power supply 100 further includes a capacitor C1 electrically coupled to the switch module 14, wherein the capacitor C1 is configured to keep the switch module 14 in an on state steadily when the control module 15 turns on the switch module 14.

Specifically, the capacitor C1 is coupled to the power input terminal 141. When the driving power circuit 140 is in the on state and the power input terminal 141 receives the driving power, the capacitor C1 is configured to filter the driving power to stabilize the voltage of the driving power provided for the relay K, so as to ensure that the relay K remains in the on state, but not jump between the on and off states under the influence of unstable voltage.

In the embodiment, the capacitor C1 is an electrolytic capacitor. An anode of the electrolytic capacitor C1 is coupled to the power input terminal 141, and the cathode of the electrolytic capacitor C1 is grounded.

In the embodiment, the switch module 14 further includes an electronic switch Q electrically coupled in series in the driving power circuit 140. The control module 15 is configured to conduct the driving power circuit 140 by switching on the electronic switch Q, to make the driving power circuit 140 be in the on state. That is, the control module 15 controls an on-off state of the relay K by controlling an on-off state of the electronic switch Q, thereby controlling the state of the electrical connection between the energy storage module 11 and the output interface 12.

Specifically, the electronic switch Q includes a control terminal electrically coupled to a control pin "2" of the control module 15, a first connection terminal electrically coupled to the fourth connection terminal "4" of the relay K, and a second connection terminal grounded.

In some embodiments, the electronic switch Q includes an N-type MOS FET (Metal Oxide Semiconductor Field Effect Transistor), and the first connection terminal, the second connection terminal, and the control terminal of the electronic switch Q correspond to the drain, source and gate of the N-type MOS field effect transistor, respectively. Further, the electronic switch Q further includes a first diode D1, an anode of the first diode D1 is coupled to the source of the MOS FET, and a cathode of the first diode D1 is coupled to the drain of the MOS FET. Wherein, the first diode D1 may be a parasitic diode or a built-in diode of the MOS field effect transistor.

In the embodiment, at the moment that the driving power disappears or the driving power circuit 140 is switched from an on state to an off state, a very high instantaneous reverse electromotive force will be generated on the coil J, and the reverse electromotive force will pass through the first diode D1 of the electronic switch Q and breakdown the first diode D1. Thus, the electronic switch Q will be burnt out.

In the embodiment, the switch module 14 further includes a second diode D2 configured to prevent the electronic switch Q coupled in the driving power circuit 140 from being burned out. Specifically, the second diode D2 and the coil J are coupled in parallel in the driving power circuit 140. In the embodiment, an anode of the second diode D2 is coupled to the fourth connection terminal "4" of the relay K, and a cathode of the second diode D2 is coupled to a third connection terminal "3" of the relay K, In this way, the second diode D2 provides a discharge circuit for the reverse electromotive force generated on the coil J, and the reverse electromotive force is released through the second diode D2, which can prevent the instantaneous reverse electromotive force generated on the coil J from breaking down the first diode D1 of the electronic switch Q. Therefore, the electronic switch Q can be protected from being burnt out, and the safety and reliability of the driving power circuit 140 can be ensured.

In the embodiment, the control module 15 is configured to switch on the electronic switch Q by outputting a control signal to the control terminal of the electronic switch Q.

In an embodiment, the control module 15 is configured to output the control signal when the voltage drop of the battery 800 within the first preset duration is greater than the preset voltage drop. In another embodiments, the control module 15 is configured to output the control signal when the voltage of the energy storage module 11 is greater than the voltage of the battery 800 and the voltage drop of the load within the first preset duration is greater than the preset voltage drop.

In addition, the switch module 14 may further include a third resistor R3, and the second connection terminal of the electronic switch Q is grounded through the third resistor R3.

When the main body 10 of the emergency starting power supply 100 is not coupled to the battery 800, the control module 15 outputs a first level signal (a low level signal in this embodiment) to switch off the MOS FET Q, so that the coil J of the relay K is powered off, thereby the single-pole single-throw switch S is switched off, causing the energy storage module 11 stop outputting electrical energy to the battery 800.

When the main body 10 of the emergency starting power supply 100 is coupled to the battery 800, the control module 15 detects the voltage of the battery 800 by the first detection module 13. When it is detected that the divided voltage across the second resistor R2 decreases, and the voltage drop within the preset duration is greater than the preset voltage drop, it is determined that the automobile is in the ignition state. At this time, the control module 15 outputs, through its control pin "2", a second level signal (a high level signal in this embodiment) to switch on the MOS FET Q, so that the coil J of the relay K is powered on, thereby the single-pole single-throw switch S is turned on, enabling the energy storage module 11 to output electrical energy to the battery 800 to provide emergency starting current for starting the automobile. In the embodiment, the second level signal is the control signal.

After the switch module 14 is turned on, the control module 15 further determines whether the duration during which the switch module 14 is in an on state is greater than a second preset duration. When the duration during which the switch module 14 is in the on state is greater than the second preset duration, the first level signal is output to switch off the MOS FET, so that the coil J of the relay K is powered off, and the single-pole single-throw switch S is switched off, which causes that the energy storage module 11 cannot output electrical energy, thereby the emergency starting power supply 100 can be prevented from outputting electrical energy to the battery 800 when it is coupled to the battery 800.

The second detection module 16 includes a fourth resistor R4 and a fifth resistor R5. A first connection terminal of the fourth resistor R4 is electrically coupled to the anode/positive connection terminal "+" of the energy storage module 11, and a second connection terminal of the fourth resistor R4 is grounded through the fifth resistor R5. The second detection pin "3" of the control module 15 is coupled to a connection node between the fourth resistor R4 and the fifth resistor R5.

Similarly, the control module 15 can also learn the voltage of the energy storage module 11 by detecting the divided voltage across the fifth resistor R5. When the main body 10 of the emergency starting power supply 100 is coupled to the battery 800, the control module 15 determines whether the voltage of the energy storage module 11 is greater than the voltage of the battery 800, and when the voltage across the fifth resistor R5 is greater than the voltage of the battery 800, the control module determines whether the voltage of the energy storage module 11 is greater than the voltage of the battery 800.

In addition, in some embodiments, the control module 15 further includes a third detection pin "4", and detects a power supply current of the energy storage module 11 through the third detection pin "4". When the power supply current of the energy storage module 11 is greater than a preset current, the control module 15 turns off the switch module 14 to protect the energy storage module 11.

Specifically, as shown in FIG. 4, the energy storage module 11 is configured to output electrical energy to the automotive battery 800 through a discharge circuit 110, to provide the emergency starting current for starting the automobile. It can be understood that, the current of the discharge circuit is the power supply current/output current of the energy storage module 11.

The switch module 14 and the output interface 12 are electrically coupled in the discharge circuit 110, respectively. In the embodiment, the the switch module 14 is electrically coupled between a positive connection terminal "+" of the energy storage module 11 and the positive interface "a" of the output interface 12.

In the embodiment, the emergency starting power supply 10 further includes a current sampling element J1 electrically coupled in series in the discharge circuit 110. The current sampling element J1 includes a first connection terminal "1" coupled to a negative connection terminal "−" of the energy storage module 11, and a second connection terminal "2" coupled to the negative interface "b" of the output interface 12.

The third detection pin "4" of the control module 15 is coupled to the second connection terminal "2" of the current sampling element J1 through a sixth resistor R6. The second connection terminal "2" of the current sampling element J1 is further grounded through the sixth resistor R6 and a capacitor C2.

It can be understood that, the voltage of a node N between the sixth resistor R6 and the capacitor C2 is equal to the voltage of the second connection terminal "2" of the current sampling element J1.

In the embodiment, the current sampling element J1 is a sampling resistor. The control module 15 is configured to detect a voltage of the second connection terminal "2" of the current sampling element J1, and determine the current of the discharge circuit 110 based on the voltage of the second connection terminal "2" of the current sampling element J1 and a resistance value of the current sampling element J1.

In this way, the control module 15 can determine whether the power supply current/output current of the energy storage module 11 is greater than a preset current by detecting the voltage of the node N between the sixth resistor R6 and the capacitor C2. When the voltage of the node N is greater than the preset voltage, it is determined that the output current of the energy storage module 11 is greater than the preset current.

Figure 5:
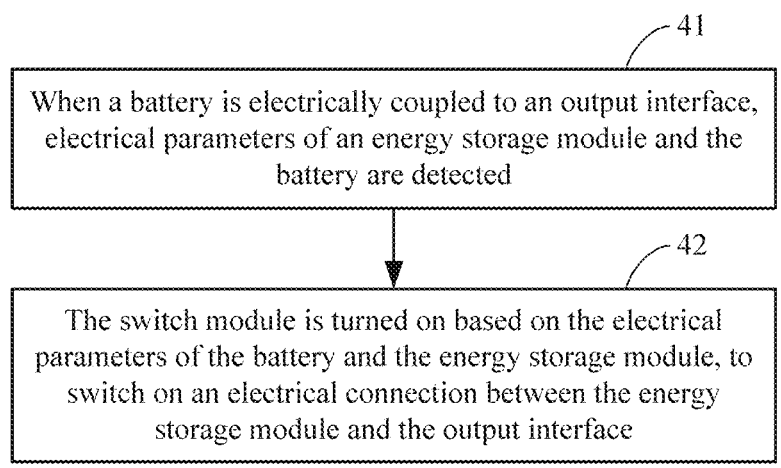
FIG. 5 is a schematic flowchart of an emergency starting method according to an embodiment of the present disclosure.

Please refer to FIG. 5, FIG. 5 is a schematic flowchart of an emergency starting method according to an embodiment of the present disclosure. The emergency starting method is applied in the emergency starting power supply 100 described above. As illustrated in FIG. 5, the emergency starting method begins at block 41.

At block 41, when the battery 800 is electrically coupled to the output interface 12, electrical parameters of the energy storage module 11 and the battery 800 are detected.

At block 42, the switch module 14 is turned on based on the electrical parameters of the battery 800 and the energy storage module 11, to switch on an electrical connection between the energy storage module 11 and the output interface 12.

In some embodiment, the electrical parameters includes a voltage. The action illustrated in the block 42 may be specifically implemented as follows. Whether the voltage of the energy storage module 11 is greater than the voltage of the battery 800, as well as whether a voltage drop of the battery 800 within a first preset duration is greater than a preset voltage drop, are determined. The switch module is turned on when the voltage of the energy storage module 11 is greater than the voltage of the battery 800 and the voltage drop of the battery 800 within the first preset duration is greater than the preset voltage drop.

In some embodiment, the emergency starting method may further includes the follows. It is determined that whether a duration during which the switch module 14 is in an on state is greater than a second preset duration after the switch module 14 is turned on. The switch module 14 is turned off to switch off the electrical connection between the energy storage module 11 and the output interface 12 when the duration during which the switch module 14 is in the on state is greater than the second preset duration.

Figure 6:
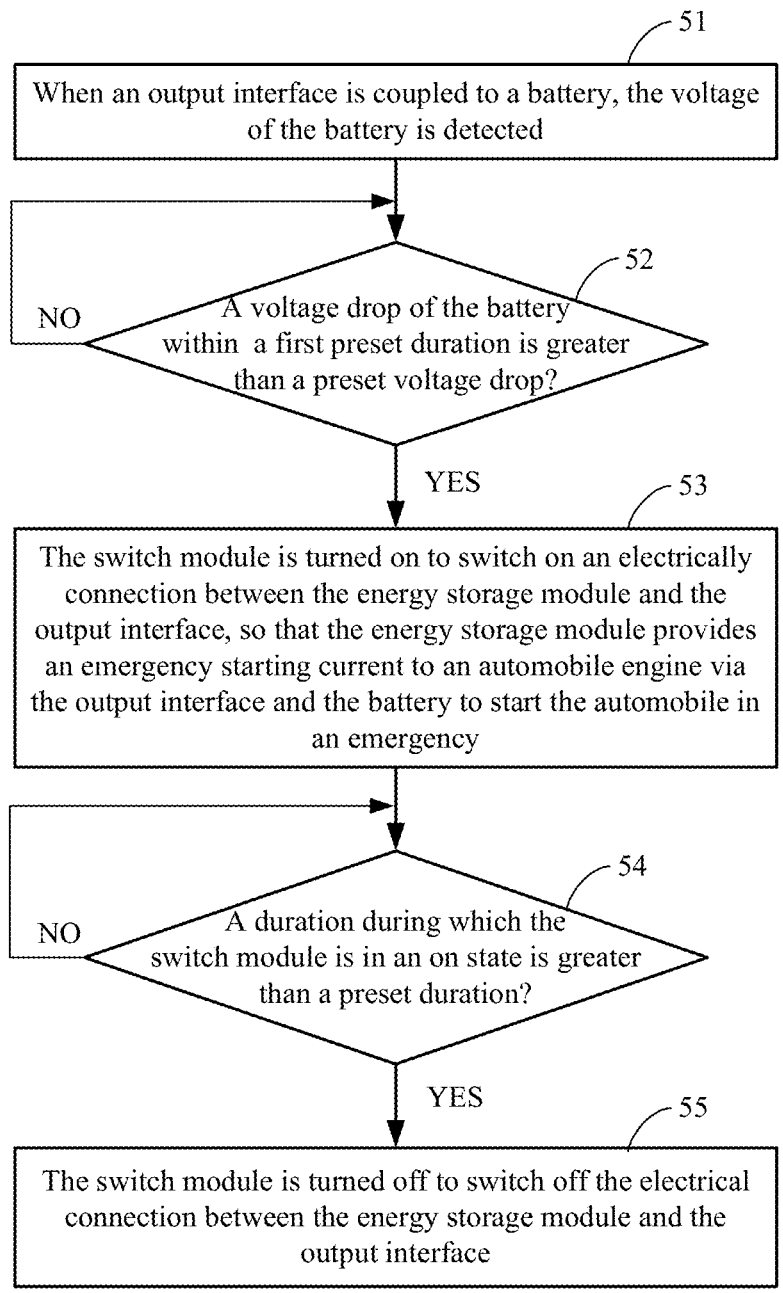
FIG. 6 is a schematic flowchart of an emergency starting method according to another embodiment of the present disclosure.

Please refer to FIG. 6, FIG. 6 is a schematic flowchart of an emergency starting method according to another embodiment of the present disclosure. The emergency starting method is applied in the emergency starting power supply 100 described above. As illustrated in FIG. 6, the emergency starting method begins at block 51.

At block 51, when the output interface 12 is coupled to the battery 800, the voltage of the battery 800 is detected.

At block 52, it is determined whether a voltage drop of the battery 800 within a first preset duration is greater than a preset voltage drop. If the voltage drop of the battery 800 within the first preset duration is greater than the preset voltage drop, the operation at block 53 is performed. If the voltage drop of the battery 800 within the first preset duration isn't greater than the preset voltage drop, the operation at block 52 is performed again.

At block 53, the switch module 14 is turned on to switch on the electrically connection between the energy storage module 11 and the output interface 12, so that the energy storage module 11 provides an emergency starting current to an automobile engine via the output interface 12 and the battery 800 to start the automobile in an emergency.

At block 54, it is determined whether a duration during which the switch module 14 is in an on state is greater than a preset duration. If the duration is greater than the preset duration, the operation at block 55 is performed. If the duration isn't greater than the preset duration, the operation at block 54 is performed again.

At block 55, the switch module 14 is turned off to switch off the electrical connection between the energy storage module 11 and the output interface 12.

Figure 7:
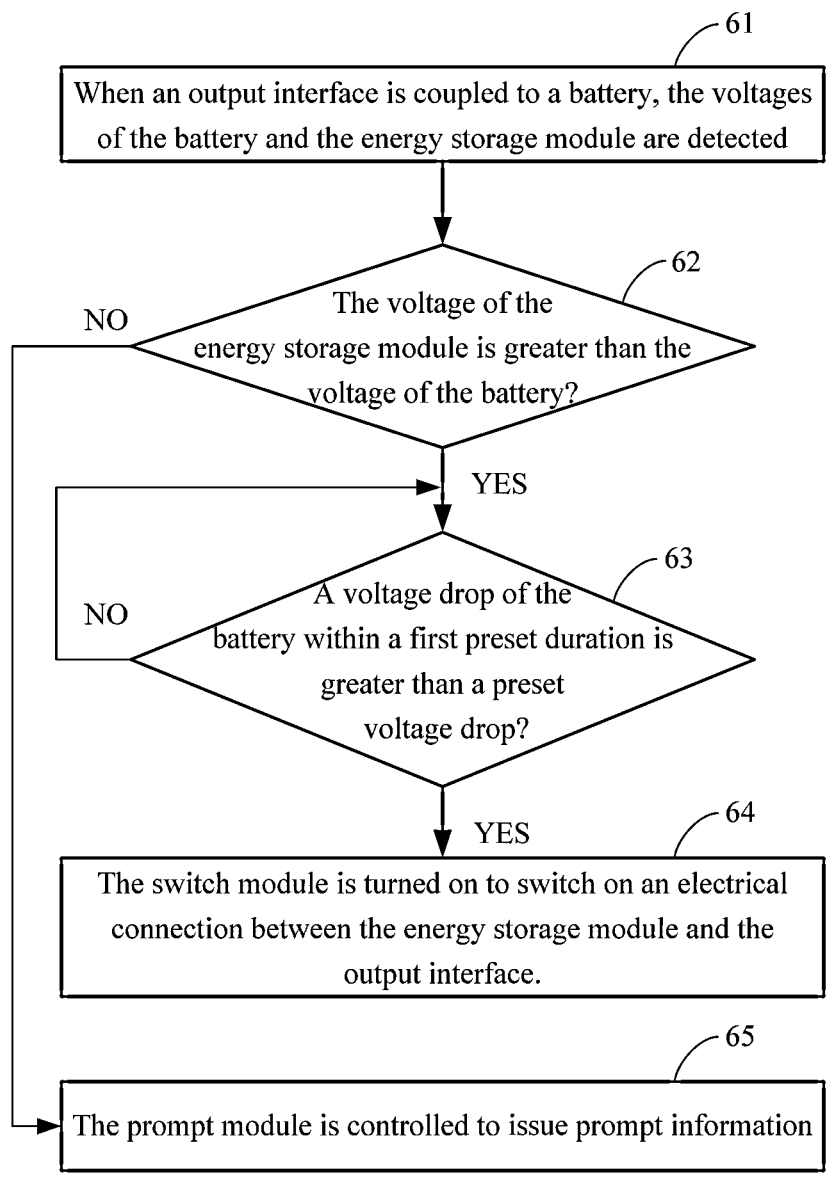
FIG. 7 is a schematic flowchart of an emergency starting method according to another embodiment of the present disclosure.

Please refer to FIG. 7, FIG. 7 is a schematic flowchart of an emergency starting method according to another embodiment of the present disclosure. The emergency starting method is applied in the emergency starting power supply 100 described above. As illustrated in FIG. 7, the emergency starting method begins at block 61.

At block 61, when the output interface is coupled to the battery, the voltages of the battery and the energy storage module 11 are detected.

At block 62, it is determined whether the voltage of the energy storage module 11 is greater than the voltage of the battery 800 according to the detected voltages of the energy storage module 11 and the voltage of the battery 800. If the voltage of the energy storage module 11 is greater than the voltage of the battery 800, the operation at 63 is performed. If the voltage of the energy storage module 11 isn't greater than the voltage of the battery 800, the operation at 65 is performed.

At block 63, it is determined whether a voltage drop of the battery 800 within a first preset duration is greater than a preset voltage drop. If the voltage drop of the battery 800 within the first preset duration is greater than the preset voltage drop, the operation at block 64 is performed. If the voltage drop of the battery 800 within the first preset duration isn't greater than the preset voltage drop, the operation at block 63 is performed again.

Wherein, the operation at block 63 is the same as the operation at block 52, and details are not described herein again.

At block 64, the switch module 14 is turned on to establish an electrical connection between the energy storage module 11 and the output interface 12.

Wherein, the operation at block 64 is the same as the operation at block 53, and details are not described herein again.

At block 65, the prompt module 17 is controlled to issue prompt information.

The prompt information is configured to prompt the user that the emergency starting power supply 100 cannot start the automobile, so that the battery 800 is prevented from charging the emergency starting power supply 100.

It should be noted that each of the foregoing embodiments of the methods has been described as a combination of a series of actions for brevity, but persons skilled in the art should understand that the present disclosure is limited to the sequence in which the actions are performed, because some of the actions can be performed in a different sequence or simultaneously according to the present disclosure. Furthermore, persons skilled in the art should also understand that the implementations described in the present disclosure are all preferable ones, while the actions and the units described herein are not necessary for the present disclosure.

In the above embodiments, the description of each embodiment has its own emphasis. For a part that is not described in detail in an embodiment, reference may be made to related descriptions in other embodiments. For the aforementioned embodiments, the description for each embodiment has its own emphasis, and what is not described in detail in one certain implementation may be known with reference to relevant description for other implementations.

The steps in the methods according to the embodiment s of the present disclosure may be merged or removed, and their sequence may be adjusted, according to actual requirements.

The interactive method provided in this disclosure can be implemented in hardware or firmware, or can be used as software or computer code that can be stored in a readable storage medium such as CD, ROM, RAM, floppy disk, hard disk, or magneto-optical disk, or it can be used as the computer code originally stored on a remote recording medium or non-transitory machine-readable medium, downloaded over a network, and stored in a local recording medium, so that the methods described herein can utilize a general purpose computer or special processor or be in a programmable or dedicated hardware such as ASIC or FPGA to be embodied in the form of software stored on a recording medium. As can be understood in the art, a computer, processor, microprocessor, controller, or programmable hardware includes a memory component, such as RAM, ROM, flash memory, etc. When a computer, processor, or hardware implements the processing method described herein to access and execute software or computer code, a memory component may store or receive software or computer code. In addition, when a general-purpose computer accesses code for implementing the processing shown here, execution of the code converts the general-purpose computer into a special-purpose computer for performing the processing shown here.

The foregoing is the typical embodiments of the present disclosure. It should be noted that, several improvements and modifications can be made by persons skilled in the art without departing from the principles of the present disclosure, and these improvements and modifications also fall within the protection scope of the present disclosure.

Wherein, the readable storage medium may be a solid-state memory, a memory card, an optical disc, or the like. The readable storage medium stores program instructions for a computer to call and executes the foregoing interaction method.

It should be noted that the above embodiments are merely intended for describing the technical solutions of the present disclosure other than limiting the present disclosure. It also should be noted that, for those of ordinary skill in the art, they can still make modifications, improvements, or retouches to the technical solutions described in the foregoing embodiments, or make equivalent substitutions to part of or all the technical features thereof. These modifications, improvements, retouches, or substitutions shall be within the protection scope of the present disclosure.

What is claimed is:

1. A charging device, comprising:
an energy storage module configured to store and provide electrical energy;
an output interface configured to be electrically coupled to a load;
a switch module electrically coupled between the energy storage module and the output interface;
a detection unit configured to detect electrical parameters of the load and the energy storage module;
a control module electrically coupled to the detection unit and the switch module respectively, wherein when the load is electrically coupled to the output interface, the control module is configured to turn on the switch module based on the electrical parameters of the load and the energy storage module, to switch on an electrical connection between the energy storage module and the output interface; and a capacitor electrically coupled to the switch module, wherein the capacitor is configured to keep the switch module in an on state steadily when the control module turns on the switch module, wherein the control module is further configured to turn off the switch module to switch off the electrical connection between the energy storage module and the output interface when a duration during which the switch module is in the on state is greater than a second preset duration.

2. The charging device of claim 1, wherein the switch module comprises a relay and a driving power circuit of the relay, wherein the relay is electrically coupled between the energy storage module and the output interface;

wherein the driving power circuit is configured to receive and transmit a driving power to the relay to turn on the relay, when the driving power circuit is in an on state.

3. The charging device of claim 2, wherein the driving power circuit comprises a driving power input terminal configured to receive the driving power for the relay;

wherein the capacitor is coupled to the power input terminal, wherein the capacitor is configured to filter the driving power to stabilize the voltage of the driving power provided for the relay.

4. The charging device of claim 2, wherein the switch module further comprises an electronic switch electrically coupled in series in the driving power circuit;

wherein the control module is configured to conduct the driving power circuit by switching on the electronic switch, to make the driving power circuit be in the on state.

5. The charging device of claim 4, wherein the electronic switch comprises a control terminal electrically coupled to the control module, wherein the control module is configured to switch on the electronic switch by outputting a control signal to the control terminal of the electronic switch.

6. The charging device of claim 5, wherein the electrical parameters comprise a voltage;

the control module is configured to receive the voltage of the load and the voltage of the energy storage module detected by the detection unit, and determine whether the voltage of the energy storage module is greater than the voltage of the load, as well as determine whether a voltage drop of the load within a first preset duration is greater than a preset voltage drop;

the control module is further configured to output the control signal when the voltage of the energy storage module is greater than the voltage of the load and the voltage drop of the load within the first preset duration is greater than the preset voltage drop.

7. The charging device of claim 1, wherein after the switch module is turned on, the control module is further configured to determine whether the duration during which the switch module is in the on state is greater than the second preset duration.

8. The charging device of claim 7, wherein the second preset duration is 4-6 s.

9. The charging device of claim 1, wherein the detection unit comprises:

a first detection module electrically coupled to the output interface and the control module respectively, wherein the first detection module is configured to detect the electrical parameters of the load through the output interface when the load is coupled to the output interface, and send the detected electrical parameters of the load to the control module; and a second detection module electrically coupled to the energy storage module and the control module respectively, wherein the second detection module is configured to detect the electrical parameters of the energy storage module, and send the detected electrical parameters of the energy storage module to the control module.

10. The charging device of claim 4, wherein the relay comprises a switch unit and a coil, wherein the switch unit is electrically coupled between the energy storage module and the output interface;

the coil is electrically coupled in series in the driving power circuit, wherein the coil is configured to cause the switch unit to be in an on state when the driving power is transmitted in the driving power circuit and a current is flowed through the coil.

11. The charging device of claim 10, wherein the switch module further comprises a diode, wherein the diode and coil are coupled in parallel in the driving power circuit, wherein the diode is configured to prevent the electronic switch coupled in the driving power circuit from being burned out.

12. The charging device of claim 1, wherein the capacitor is an electrolytic capacitor.

13. The charging device of claim 6, wherein the charging device further comprises a prompt module electrically coupled to the control module;

the control module is further configured to control the prompt module to issue prompt information when the voltage of the energy storage module is not greater than the voltage of the load.

14. An emergency starting method applied in the charging device of claim 1, wherein the emergency starting method comprises:

detecting electrical parameters of the energy storage module and a load, when the load is electrically coupled to the output interface;

turning on the switch module based on the electrical parameters of the load and the energy storage module, to switch on an electrical connection between the energy storage module and the output interface; and turning off the switch module to switch off the electrical connection between the energy storage module and the output interface when a duration during which the switch module is in the on state is greater than a second preset duration.

15. The emergency starting method of claim 14, wherein the electrical parameters comprise a voltage; wherein turning on the switch module based on the electrical parameters of the load and the energy storage module comprises:

determining whether the voltage of the energy storage module is greater than the voltage of the load, as well as determining whether a voltage drop of the load within a first preset duration is greater than a preset voltage drop; and turning on the switch module when the voltage of the energy storage module is greater than the voltage of the load and the voltage drop of the load within the first preset duration is greater than the preset voltage drop.

16. The emergency starting method of claim 14, wherein the emergency starting method further comprises:

determining whether the duration during which the switch module is in an on state is greater than the second preset duration after the switch module is turned on.

* * * * *